(12) United States Patent
Hart et al.

(10) Patent No.: US 12,388,258 B2
(45) Date of Patent: Aug. 12, 2025

(54) SYSTEMS AND METHODS FOR POWER SETPOINT CONTROL FOR HYBRID POWER GENERATION FACILITIES

(71) Applicant: GE Grid GmbH, Frankfurt Am Main (DE)

(72) Inventors: Patrick Hammel Hart, Ballston Lake, NY (US); Charles Joseph Kosuth, Asheville, NC (US); Alina Fatima Moosvi, San Franscisco, CA (US)

(73) Assignee: GE GRID GMBH, Frankfurt (DE)

( * ) Notice: Subject to any disclaimer, the term of this patent is extended or adjusted under 35 U.S.C. 154(b) by 556 days.

(21) Appl. No.: 17/726,025

(22) Filed: Apr. 21, 2022

(65) Prior Publication Data

US 2023/0344226 A1  Oct. 26, 2023

(51) Int. Cl.
*H02J 3/00* (2006.01)
*H02J 3/32* (2006.01)
*H02J 3/46* (2006.01)

(52) U.S. Cl.
CPC ............. *H02J 3/004* (2020.01); *H02J 3/003* (2020.01); *H02J 3/32* (2013.01); *H02J 3/466* (2020.01); *H02J 2203/10* (2020.01)

(58) Field of Classification Search
CPC .... H02J 3/004; H02J 3/003; H02J 3/32; H02J 3/466; H02J 2203/10; H02J 3/381; H02J 2203/20
See application file for complete search history.

(56) References Cited

U.S. PATENT DOCUMENTS

| | | |
|---|---|---|
| 7,454,270 B2 | 11/2008 | Mansingh et al. |
| 9,091,245 B2 | 7/2015 | Lobato Pena et al. |
| 9,359,996 B2 | 6/2016 | Gupta et al. |
| 9,528,496 B2 | 12/2016 | Mayer |
| 9,709,034 B2 | 7/2017 | Kjær et al. |
| 9,728,969 B2 | 8/2017 | Tarnowski |
| 9,935,478 B2 | 4/2018 | Coe et al. |
| 9,941,700 B2 | 4/2018 | Bhavaraju et al. |
| 10,033,317 B2 | 7/2018 | Schultz |

(Continued)

FOREIGN PATENT DOCUMENTS

WO  2017062899 A1  4/2017

OTHER PUBLICATIONS

ISR and WO for international application No. PCT/US2023/019345, Sep. 1, 2023, 7 pages.

*Primary Examiner* — Christopher E. Everett
(74) *Attorney, Agent, or Firm* — Armstrong Teasdale LLP

(57) ABSTRACT

A power generation system is provided. The power generation system includes a power generating asset configured to supply power to a power grid. The power generating asset includes at least one power generating device and at least one energy storage device coupled to the at least one power generating device. The power generation system further includes a controller coupled in communication with the power generating asset. The controller is configured to measure a current power output of the at least one power generating device. The controller is further configured to predict a future power output of the at least one power generating device at a future timepoint. The controller is further configured to determine a target power setpoint based on the current power output and the predicted future power output.

18 Claims, 5 Drawing Sheets

(56) References Cited

U.S. PATENT DOCUMENTS

| | | | |
|---|---|---|---|
| 10,167,850 B2 | 1/2019 | Chen et al. | |
| 2010/0198420 A1* | 8/2010 | Rettger | H02S 10/00 706/46 |
| 2010/0204844 A1* | 8/2010 | Rettger | H02J 3/381 700/297 |
| 2011/0221276 A1* | 9/2011 | Geinzer | H02J 7/35 307/66 |
| 2011/0276269 A1* | 11/2011 | Hummel | G01W 1/10 702/3 |
| 2012/0261990 A1* | 10/2012 | Collins | H02J 3/381 307/44 |
| 2012/0326511 A1* | 12/2012 | Johnson | H02S 10/00 307/52 |
| 2014/0358316 A1* | 12/2014 | Shichiri | H02J 3/466 700/297 |
| 2015/0019034 A1* | 1/2015 | Gonatas | H02S 10/00 700/291 |
| 2016/0154397 A1* | 6/2016 | Guelbenzu Michelena | H02J 3/381 700/295 |
| 2016/0315475 A1* | 10/2016 | Carlson | H02J 7/35 |
| 2017/0060113 A1* | 3/2017 | Kaucic | G05B 19/042 |
| 2017/0102675 A1* | 4/2017 | Drees | H02S 50/00 |
| 2017/0104337 A1* | 4/2017 | Drees | H02J 3/381 |
| 2017/0104343 A1* | 4/2017 | ElBsat | H02J 3/388 |
| 2017/0104345 A1* | 4/2017 | Wenzel | H02J 3/008 |
| 2017/0104449 A1* | 4/2017 | Drees | G01W 1/10 |
| 2017/0117744 A1* | 4/2017 | Ye | H02S 40/38 |
| 2017/0331290 A1* | 11/2017 | Burlinson | G05B 15/02 |
| 2018/0034285 A1* | 2/2018 | Baumgartner | H01M 10/441 |
| 2018/0355848 A1* | 12/2018 | Wei | F03D 7/026 |
| 2020/0227921 A1* | 7/2020 | Guelbenzu Michelena | G05B 13/048 |
| 2020/0244094 A1* | 7/2020 | Kuo | H02J 3/32 |
| 2022/0285945 A1* | 9/2022 | Hovgaard | H02J 3/381 |
| 2022/0311379 A1* | 9/2022 | Hansen | H02J 3/381 |
| 2023/0411966 A1* | 12/2023 | Skjelmose | H02J 3/46 |

* cited by examiner

SYSTEMS AND METHODS FOR POWER SETPOINT CONTROL FOR HYBRID POWER GENERATION FACILITIES

BACKGROUND

The field of the invention relates generally to control systems for power generation facilities, and more particularly, to power setpoint control for hybrid power generation facilities.

Renewable power production facilities, or "farms," include a group of power generating assets, such as wind turbines, solar cells, or the like, and are used to supply power to power grids. Because of the intermittent nature of renewable power, in which the power production capabilities of renewable power generating assets may vary over time, energy storage devices such as batteries are used to ensure that power may be output to the grid at a controlled setpoint. This setpoint may be adjusted, for example, based on available renewable power production.

Generally, when the power setpoint does not match power currently generated renewable power, the energy storage devices will charge (e.g., when the renewable power generation is greater than the power setpoint) or discharge (e.g., when the renewable power generation is less than the power setpoint). This change in state of charge may place fatigue on the energy storage devices and reduce their operational lifetime.

For example, in some known systems, the setpoint may be adjusted using "ramping." That is, rather than instantaneously changing the setpoint, the setpoint may be gradually adjusted to another power value. Generally, the state of charge of the energy storage device changes during this process, because for a period of time during the ramping, there may be a mismatch between the renewable power produced and the power output of the asset. As a result, power generating assets that utilize ramping require higher capacity energy storage, and energy storage devices may experience increased fatigue.

A power production system that can reduce such changes in state of charge is therefore desirable.

BRIEF DESCRIPTION

In one aspect, a power generation system is provided. The power generation system includes a power generating asset configured to supply power to a power grid. The power generating asset includes at least one power generating device and at least one energy storage device coupled to the at least one power generating device. The power generation system further includes a controller coupled in communication with the power generating asset. The controller is configured to measure a current power output of the at least one power generating device. The controller is further configured to predict a future power output of the at least one power generating device at a future timepoint. The controller is further configured to determine a target power setpoint based on the current power output and the predicted future power output.

In another aspect, a method for controlling a power generation system is provided. The power generation system includes a power generating asset configured to supply power to a power grid. The power generating asset includes at least one power generating device and at least one energy storage device coupled to the at least one power generating device. The power generating system further includes a controller coupled in communication with the power generating asset. The method includes measuring, by the controller, a current power output of the at least one power generating device. The method further includes predicting, by the controller, a future power output of the at least one power generating device at a future timepoint. The method further includes determining, by the controller, a target power setpoint based on the current power output and the predicted future power output.

In another aspect, a controller for a power generation system is provided. The power generation system is coupled in communication with the controller and includes a power generating asset configured to supply power to a power grid. The power generating asset includes at least one power generating device and at least one energy storage device coupled to the at least one power generating device. The controller is configured to measure a current power output of the at least one power generating device. The controller is further configured to predict a future power output of the at least one power generating device at a future timepoint. The controller is further configured to determine a target power setpoint based on the current power output and the predicted future power output.

DRAWINGS

These and other features, aspects, and advantages of the present disclosure will become better understood when the following detailed description is read with reference to the accompanying drawings in which like characters represent like parts throughout the drawings, wherein.

Figure 4A:
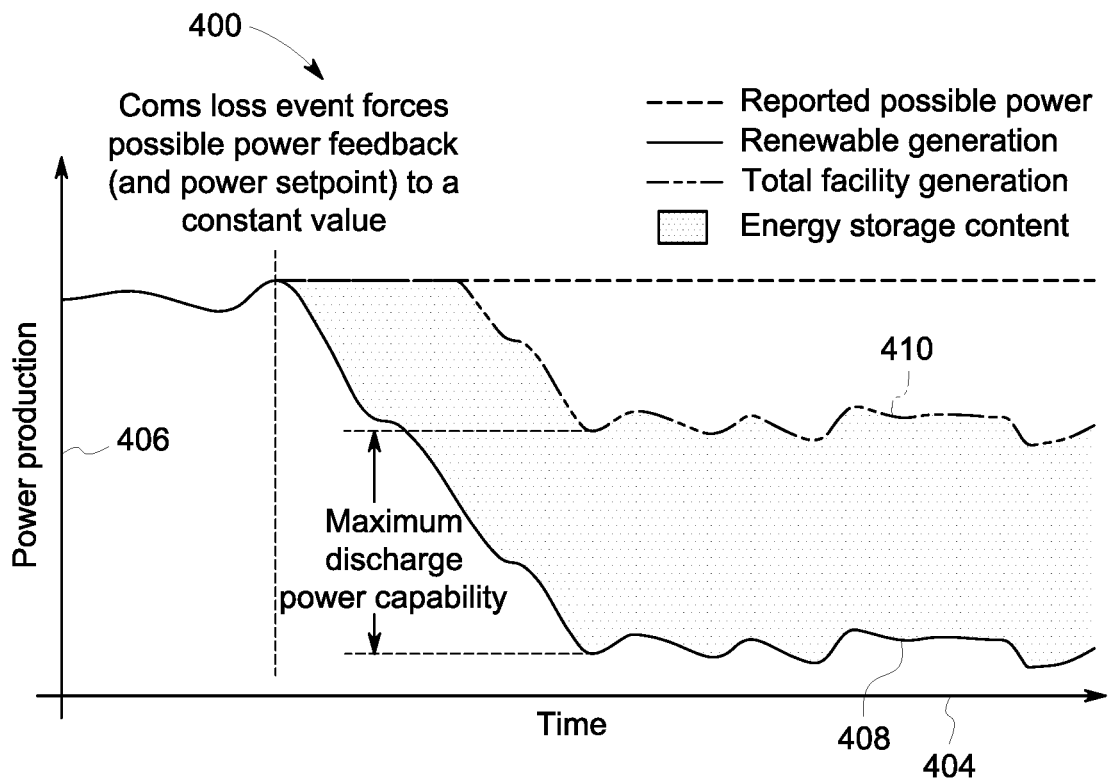
FIG. 4A is a graph illustrating power production over time during a fault event.
Figure 4B:
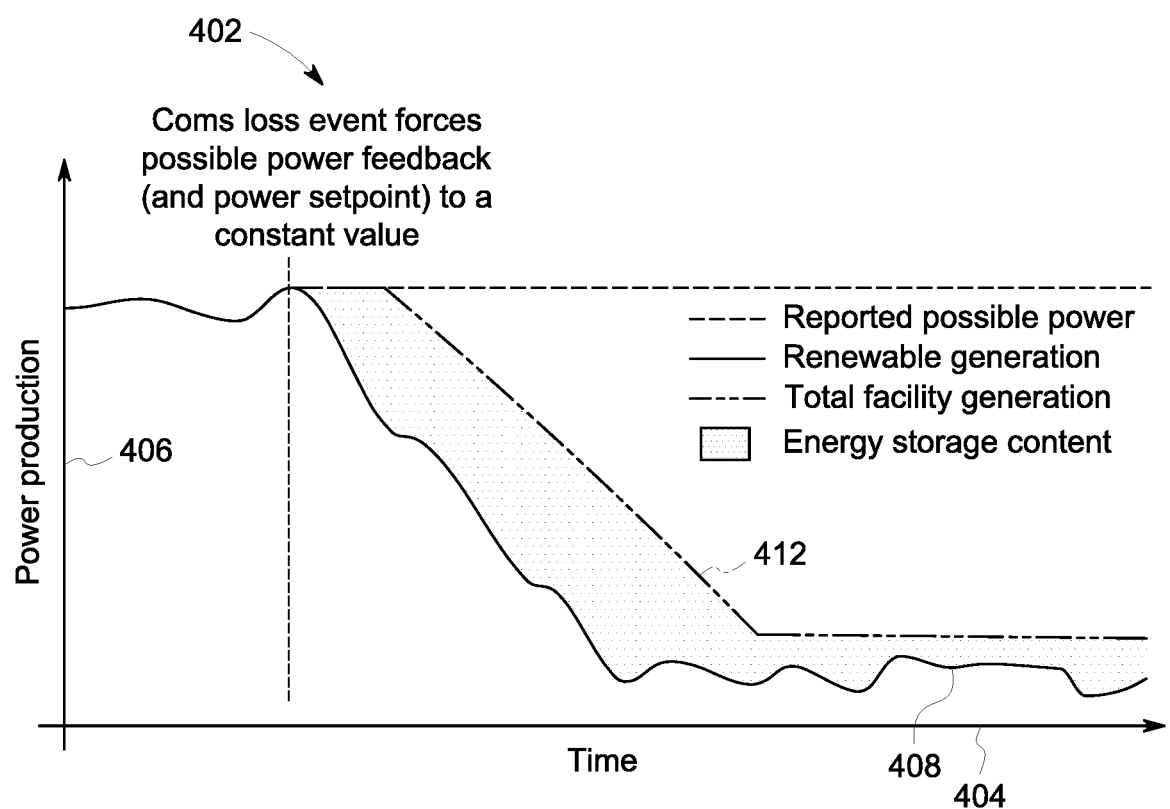

FIG. 4B a graph illustrating power production over time during a fault event in which the power production is adjusted to account for the fault event.

Figure 5:
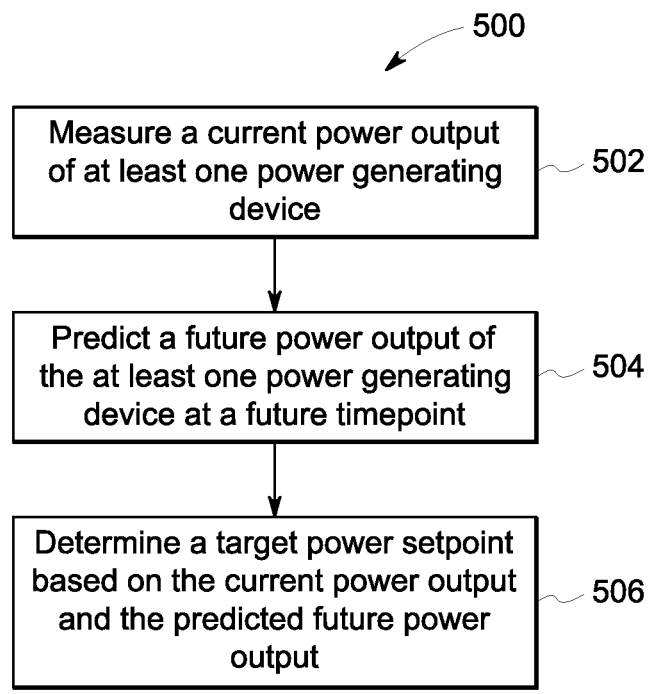

FIG. 5 is a flowchart of an example method for controlling a power generation system.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein include a power generation system. The power generation system includes a power generating asset configured to supply power to a power grid. The power generating asset includes at least one power generating device and at least one energy storage device coupled to the at least one power generating device. The power generation system further includes a controller coupled in communication with the power generating asset.

The controller is configured to measure a current power output of the at least one power generating device, and to predict a future power output of the at least one power generating device at a future timepoint. The controller is further configured to determine a target power setpoint based on the measured current power output and the predicted future power output. By using both current feedback and predictive analysis, over time, a matching of the power setpoint and the power produced by the power generating device may be improved, reducing a change in state of charge of the energy storage device. Further, in some embodiments, historical analysis is used, for example, to detect system faults, which may further improve an ability of the controller to accurately determine a power setpoint corresponding to the actual power produced by the power generating device.

In some embodiments, the controller is further configured to, prior to the future timepoint, ramp a current power setpoint of the power generating asset toward the target power setpoint, wherein the current power setpoint reaches the target power setpoint after the future timepoint. By initiating ramping prior to the change in power production at the future timepoint, the change in state of charge of the energy storage device may be decreased, resulting in smaller costs associated with capacity requirements and wear on the energy storage device.

In some embodiments, the controller is further configured to detect a fault condition (e.g., a communication fault) causing a current reported power output from the power generating asset to differ from an actual power output from the power generating assets, for example, by determining that the state of charge of the energy storage devices falls outside a threshold range. The controller may further adjust the current power setpoint in response to the detection of the fault condition. This may further reduce the change in state of charge of the energy storage device.

Figure 1:
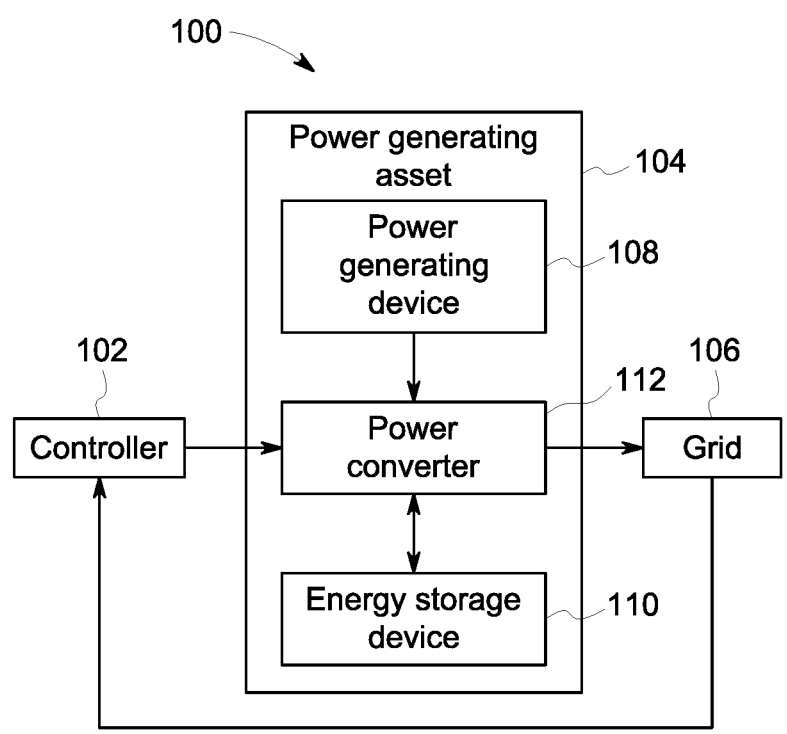
FIG. 1 is a block diagram of an example control system.

FIG. 1 is a block diagram illustrating an example power generation system 100. Power generation system 100 includes a controller 102 and at least one of a plurality of power generating assets 104 configured to supply power to power grid 106. Controller 102 controls operating parameters of power generating assets 104 such as, for example, a power production setpoint. This control may be based on closed-loop feedback from power grid 106, or from other factors, as described in further detail below.

Power generating asset 104 includes at least power generating device 108, which may be, for example, a wind turbine, a solar cell, and/or anther renewable power source. Power generating asset 104 further includes an energy storage device 110, such as a battery, that is configured to temporarily store energy provided by power generating device 108 by charging in response to receiving power from power generating device 108 and discharging to output stored power. Power generating asset 104 further includes a power converter 112, which is configured to convert power output by power generating device 108 (e.g., direct current (DC) power of a first voltage) into power suitable for storage in energy storage device 110 (e.g., DC power of a second voltage), and to convert power output by energy storage device 110 to power suitable for supplying to power grid 106 (e.g., alternating current (AC) power).

Power converter 112 operates under the control of controller 102, so that power may be output from power grid 106 at a setpoint demanded by controller 102. If this power setpoint is less than the power currently produced by power generating device 108, energy will accumulate in energy storage device 110, and if the power setpoint is greater than the power currently produced by power generating device 108, energy storage device 110 will discharge. As described in further detail below, controller 102 is configured to adjust the setpoint based on the current power production of power generating device 108 and on a predicted future power production of power generating device 108.

In some embodiments, when the power setpoint is adjusted, rather than instantaneously changing the setpoint, controller 102 may ramp, or gradually change, the setpoint. The ramping may occur at a prescribed ramp rate, defined by a particular change in power production over time. Accordingly, a time needed for the ramped adjustment in power setpoint to occur depends on the ramp rate and the magnitude of the power adjustment.

Figure 2:
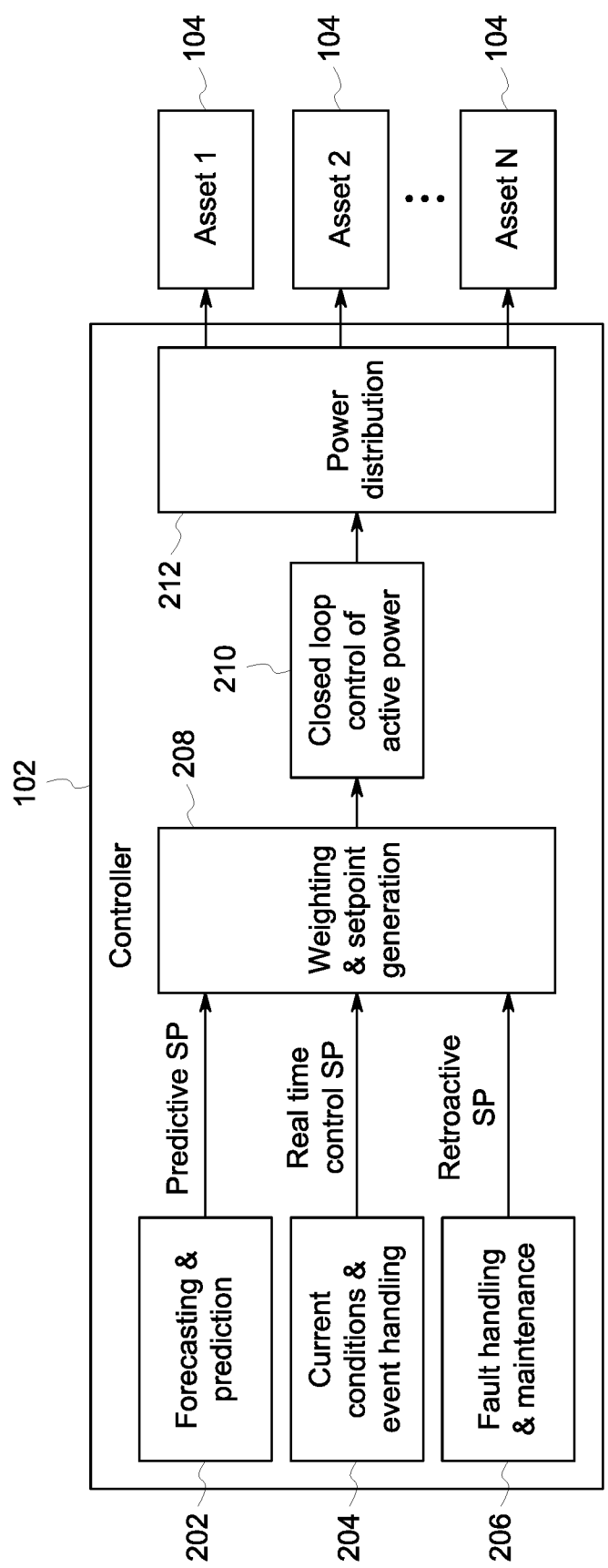
FIG. 2 is another block diagram of the example control system illustrated in FIG. 1.

Referring to FIG. 2, controller 102 includes a forecasting and prediction module 202, a current conditions and event handling module 204, a fault handling and maintenance module 206, a weighting and setpoint generation module 208, a closed loop control module 210, and a power distribution module 212, which may each be implemented using hardware, software, and/or a combination thereof, for example, by executing computer-executable instruction stored on a memory device using a processor.

Prediction module 202 is configured to predict a future power output at a future timepoint. For example, prediction module 202 may identify a forecast of all variable generation in the next few minutes of power production. If the power generated by power generation device 108 is expected to change, prediction module 202 may determine a new power setpoint based on the predicted power output.

In some embodiments, controller 102 is configured to, based on an output of prediction module 202, begin ramping the power setpoint prior to the occurrence of the timepoint. For example, prediction module 202 may predict that the power output of power generating device 108 will fall to a lower level at time t. Prior to time t, controller 102 begins ramping down the power setpoint of power generating asset 104, for example, at a substantially constant ramp rate. Prior to time t, power will accumulate in energy storage device 110, and after time t and before the ramping is completed, power will be dissipated from energy storage device 110. Assuming that the predicted change in power production of power generating device 108 is correct and that time t occurs approximately halfway through the ramping, the net change in state of charge of energy storage device 110 is close to zero. Similarly, if prediction module 202 predicts that the power output of power generating device 108 will rise at time t, energy storage device 110 will discharge during the ramping prior to time t and recharge during the ramping after time t, for a net change in charge near zero.

Current conditions and event handling module 204 is configured to adjust the power setpoint in response to a current power output of power generating device 108. For example, current conditions and event handling module 204 may measure, or receive a measurement of, a current power output of power generating device 104, and determine the setpoint based on the measured current power output. By adjusting the power setpoint to match the current power output of power generating device 108, a charge rate of energy storage device 110 is minimized, because the net flow of power into the system from power generating device 108 is equal to the power flowing out to the grid.

Fault handling and maintenance module 206 is configured to adjust the setpoint maintain a state of charge range of energy storage device 110. For example, a communication fault may occur within power generating asset 104 where the power output of power generating device 108 is misdetected or misreported, which may a mismatch between the power output by power generating device 108 and the current setpoint. This mismatch may result in a change of the state of charge of energy storage device 110, for example, accumulating charge if the power output by power generating device 108 exceeds the power setpoint or discharging if the power output by power generating device 108 is less than the operating setpoint. If the state of charge of energy storage device 110 falls outside of a predefined range as a result, controller 102 is configured to adjust the power setpoint to compensate for this mismatch. For example, if controller 102 detects that the state of charge of energy storage device 110 is to low, controller 102 is configured to determine that the power setpoint is greater than the actual power output of power generating device 108, and adjust the setpoint lower accordingly.

Weighting and setpoint generation module 208 is configured to determine the power setpoint and ramp rate based on inputs from forecasting and prediction module 202, current conditions and event handling module 204, and fault handling and maintenance module 206. In some embodiments, weighting and setpoint module 208 determines the setpoint by one or more of fixed or dynamic weighting of the setpoints, cost function optimization, rules based selection, priority based selection, constraint based bounding, and or a simple summation of setpoints.

Closed loop control module 210 generates a control signal for one or more power generating assets 104 based on closed loop feedback from the power generating assets 104 and the determined power setpoint. Power distribution module 212 transmits respective control signals to the one or more power generating assets 104.

Figure 3A:
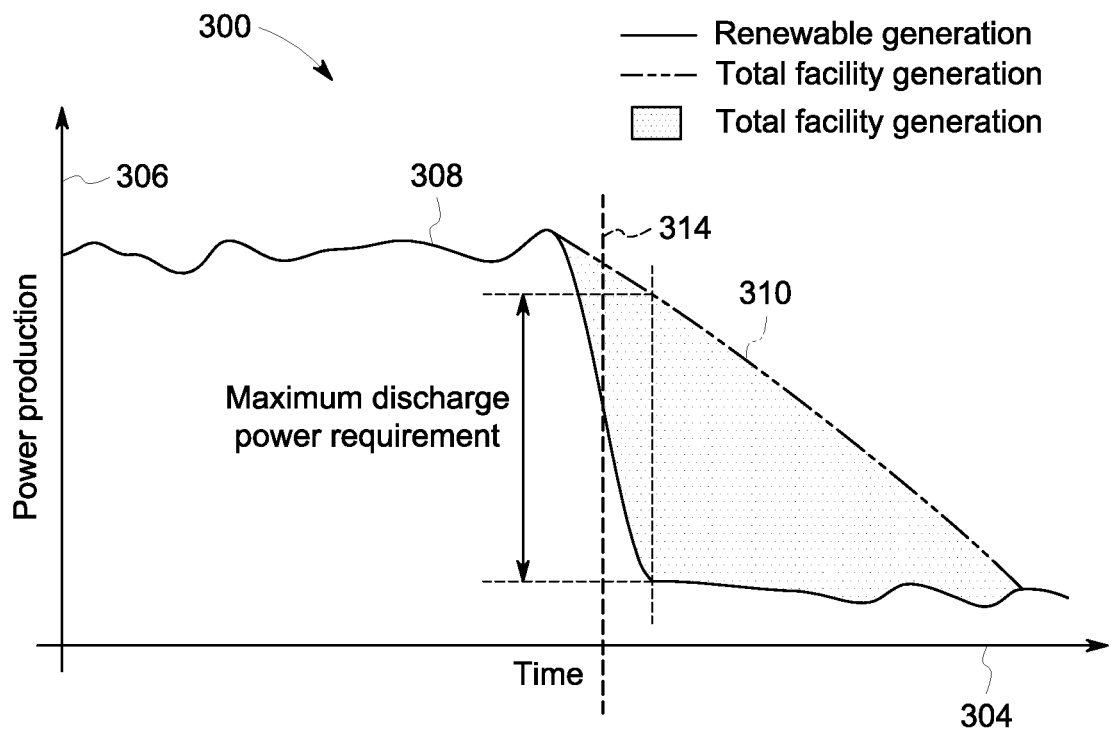
FIG. 3A is a graph illustrating power production over time when the total power production is ramped following a reduction in renewable power generation.
Figure 3B:
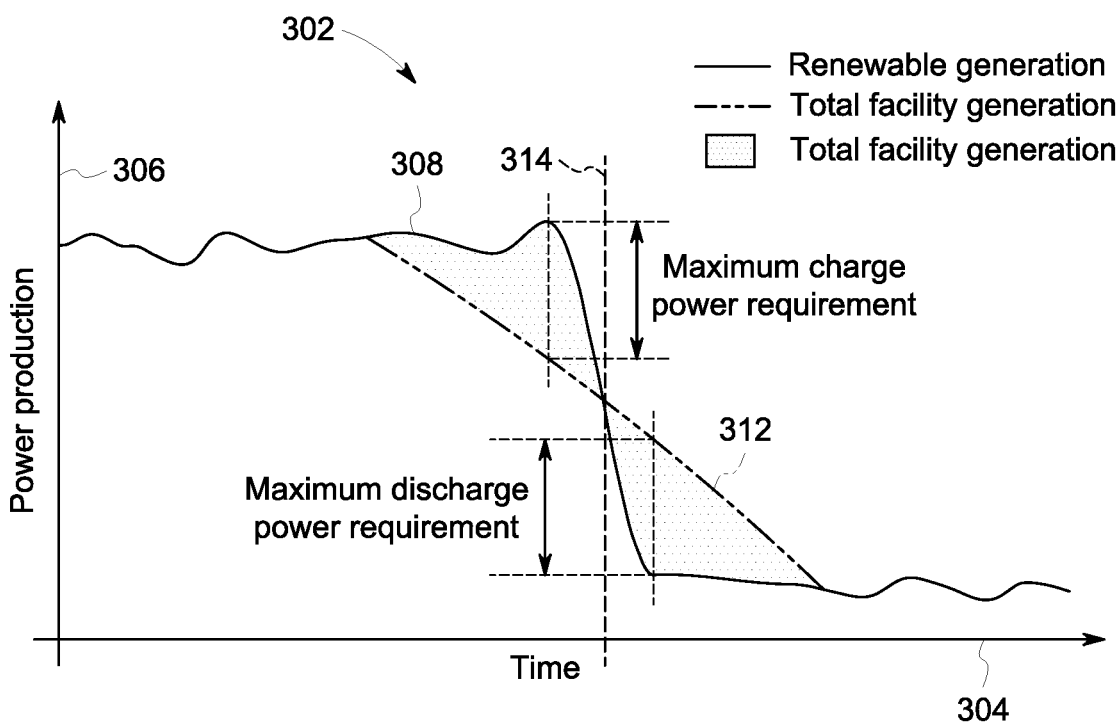
FIG. 3B is a graph illustrating power production over time when the total power production is ramped prior to a reduction in renewable power generation.

FIG. 3A is a graph 300 of power production over time when the total power production is ramped following a reduction in renewable power generation, and FIG. 3B is a graph 302 of power production over time when the total power production is ramped prior to a reduction in renewable power generation as described with respect to forecasting and prediction module 202 (shown in FIG. 2). Graphs 300 and 302 each have a horizontal axis 304 representing time elapsed and a vertical axis 306 representing power production. Graphs 300 and 302 each have a power production curve 308, which represents a power output of, for example, power generation device 108 (shown in FIG. 1). Graphs 300 and 302 each also have respective total facility generation curves 310 and 312, which represent the power setpoint of power generating asset 104. Power production curve 308 indicates a reduction in power output of power generation device 108 at a timepoint 314.

In graph 300, as indicated by total facility generation curve 310, ramping of the power setpoint occurs after timepoint 314. Accordingly, for a period of time following timepoint 314, energy storage device 110 is discharged, resulting in a net loss of charge. In graph 302, as indicated by total facility generation curve 310, ramping is initiated prior to timepoint 314, for example, in response to a prediction that power output will fall by forecasting and prediction module 202. Prior to timepoint 314, when the ramped power setpoint is less than the power production indicated by power production curve 308, energy storage device 110 is discharged, while after timepoint 314, when the ramped power setpoint is greater than the power indicated by power production curve 308, energy storage device 110 is recharged, resulting in a net change in charge of energy storage device 110 that is close to zero.

FIG. 4A is a graph 400 power production over time during a fault event. FIG. 4B is a graph 402 of power production over time during a fault event in which the power production is adjusted to account for the fault event as described with respect to fault handling and maintenance module 206 (shown in FIG. 2). Graphs 400 and 402 each have a horizontal axis 404 representing time elapsed and a horizontal axis 406 representing power production. Graphs 400 and 402 each have a renewable generation curve 408, which represents a power output of, for example, power generation device 108 (shown in FIG. 1). Graphs 400 and 402 each also have respective total facility generation curves 410 and 412, which represent which represent the power setpoint of power generating asset 104.

As shown in FIG. 4A, if a communication fault occurs, a reported power generation may differ from the actual power generation, which results in a power setpoint (indicated by total facility generation curves 410) that is higher than the actual renewable power generated (indicated by renewable generation curve 408). This situation results in a discharge of energy storage device 110. As shown in FIG. 4B, based on a detection of the communication fault by fault handling and maintenance module 206, the power setpoint (indicated by total facility generation curves 412) is adjusted to coincide with the actual renewable power generated (indicated by renewable generation curve 408), which may reduce or eliminate a change in the state of charge of energy storage device 110.

FIG. 5 is a flowchart illustrating an example method 500 for controlling a power production system. In some embodiments, method 500 is performed by a power generation system (such as power generation system 100, shown in FIGS. 1 and 2), for example, using controller 102.

Method 500 includes measuring 502, by the controller, a current power output of at least one power generating device (such as power generation device 108). Method 500 further includes predicting 504, by the controller, a future power output of the at least one power generating device at a future timepoint. Method 500 further includes determining 506, by the controller a target power setpoint based on the current power output and the predicted future power output.

In some embodiments, method 500 further includes, prior to the future timepoint, ramping, by the controller a current power setpoint of the power generating asset toward the target setpoint, wherein the current power setpoint reaches the target power setpoint after the future timepoint. In some such embodiments, method 500 further includes selecting, by the controller, a ramp rate at which to ramp the current power setpoint. In some such embodiments, selecting the ramp rate includes selecting, by the controller, a ramp rate that reduces a change in state of charge of at least one energy storage device (such as energy storage device 110).

In certain embodiments, method 500 further includes detecting, by the controller, a fault condition causing a current reported power output from the power generating asset to differ from an actual power output from the power generating asset, and adjusting, by the controller, the current power setpoint in response to the detection of the fault condition. In some such embodiments, detecting the fault condition includes detecting, by the controller, the fault condition based on determining that a state of charge of the energy storage device is outside a threshold range. In certain such embodiments, adjusting the current power setpoint includes adjusting, by the controller, the current power setpoint to reduce change in state of charge of the at least one energy storage device.

In some embodiments, the at least one energy storage device includes a battery.

In certain embodiments, the power generation system further includes a plurality of power generating assets (such as power generating assets 104), and method 500 further includes determining, by the controller, a respective power setpoint for each power generating asset of the plurality of power generating assets.

An example technical effect of the methods, systems, and apparatus described herein includes at least one of: (a) reducing a charge capacity requirement for energy storage devices used in renewable power production facilities by reducing changes in state of charge that occur due to changes in renewable power production; and (b) reducing fatigue due to change in state of charge for energy storage devices used in renewable power production facilities by reducing changes in state of charge that occur due to changes in renewable power production.

Example embodiments of a power generation system are provided herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the example embodiments can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above embodiments are examples only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power generation system comprising:
    a power generating asset configured to supply power to a power grid, said power generating asset comprising at least one power generating device and at least one energy storage device coupled to said at least one power generating device;
    a controller coupled in communication with said power generating asset, said controller configured to:
        measure a current power output of said at least one power generating device;
        predict a future power output of said at least one power generating device at a future timepoint;
        determine a target power setpoint based on the current power output and the predicted future power output; and
        prior to the future timepoint, control a current power setpoint of said power generating asset to reach the target power setpoint over a period of time at a preselected ramp rate, wherein the preselected ramp rate is selected to cause a net change in a state of charge of the power generating asset during the period of time to be substantially zero.

2. The power generation system of claim 1, wherein said controller is further configured to, during the period of time, ramp a current power setpoint of said power generating asset toward the target power setpoint, wherein the current power setpoint reaches the target power setpoint after the future timepoint.

3. The power generation system of claim 2, wherein said controller is further configured to select a constant ramp rate at which to ramp the current power setpoint.

4. The power generation system of claim 1, wherein said controller is further configured to:
    detect a fault condition causing a current reported power output from said power generating asset to differ from an actual power output from the power generating asset; and
    adjust the current power setpoint in response to the detection of the fault condition.

5. The power generation system of claim 4, wherein to detect the fault condition, said controller is configured to detect the fault condition based on determining that a state of charge of said energy storage device is outside a threshold range.

6. The power generation system of claim 5, wherein to adjust the current power setpoint, said controller is configured to adjust the current power setpoint to reduce change in a state of charge of said at least one energy storage device.

7. The power generation system of claim 1, wherein said at least one energy storage device comprises a battery.

8. The power generation system of claim 1, further comprising a plurality of power generating assets, wherein said controller is configured to determine a respective power setpoint for each power generating asset of said plurality of power generating assets.

9. A method for controlling a power generation system, the power generation system including a power generating asset configured to supply power to a power grid, the power generating asset including at least one power generating device and at least one energy storage device coupled to the at least one power generating device, the power generating system further including a controller coupled in communication with the power generating asset, said method comprising:

measuring, by the controller, a current power output of the at least one power generating device;

predicting, by the controller, a future power output of the at least one power generating device at a future timepoint;

determining, by the controller, a target power setpoint based on the current power output and the predicted future power output; and prior to the future timepoint, controlling a current power setpoint of said power generating asset to reach the target power setpoint over a period of time at a preselected ramp rate, wherein the preselected ramp rate is selected to cause a net change in a state of charge of the power generating asset during the period of time to be substantially zero.

10. The method of claim 9, further comprising, during the period of time, ramping, by the controller, a current power setpoint of the power generating asset toward the target power setpoint, wherein the current power setpoint reaches the target power setpoint after the future timepoint.

11. The method of claim 10, further comprising selecting, by the controller, a constant ramp rate at which to ramp the current power setpoint.

12. The method of claim 9, further comprising:

detecting, by the controller, a fault condition causing a current reported power output from the power generating asset to differ from an actual power output from the power generating asset; and adjusting, by the controller, the current power setpoint in response to the detection of the fault condition.

13. The method of claim 12, wherein detecting the fault condition comprises detecting, by the controller, the fault condition based on determining that a state of charge of the energy storage device is outside a threshold range.

14. The method of claim 13, wherein adjusting the current power setpoint comprises adjusting, by the controller, the current power setpoint to reduce change in state of charge of the at least one energy storage device.

15. The method of claim 9, wherein the power generation system further includes a plurality of power generating assets, and wherein said method further comprises determining, by the controller, a respective power setpoint for each power generating asset of the plurality of power generating assets.

16. A controller for a power generation system, the power generation system coupled in communication with said controller and including a power generating asset configured to supply power to a power grid, the power generating asset including at least one power generating device and at least one energy storage device coupled to the at least one power generating device, said controller configured to:

measure a current power output of the at least one power generating device;

predict a future power output of the at least one power generating device at a future timepoint;

determine a target power setpoint based on the current power output and the predicted future power output; and prior to the future timepoint, control a current power setpoint of said power generating asset to reach the target power setpoint over a period of time at a preselected ramp rate, wherein the preselected ramp rate is selected to cause a net change in a state of charge of the power generating asset during the period of time to be substantially zero.

17. The controller of claim 16, further configured to, during the period of time, ramp a current power setpoint of the at least one power generating asset toward the target power setpoint, wherein the current power setpoint reaches the target power setpoint after the future timepoint.

18. The controller of claim 17, further configured to select a constant ramp rate at which to ramp the current power setpoint.

* * * * *